May 26, 1931. G. C. BURKETT 1,807,303
TRAILER HITCH
Filed Oct. 15, 1929
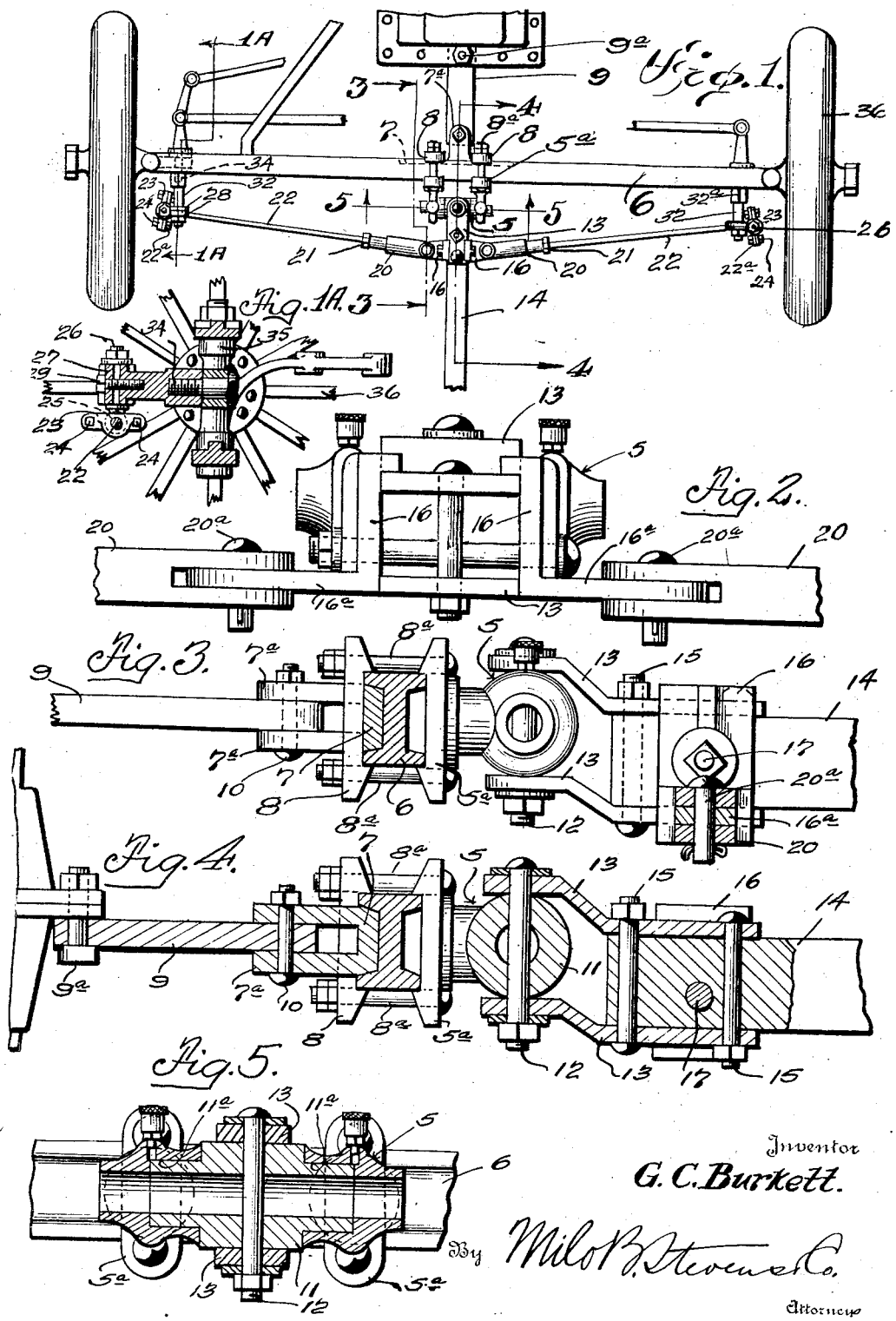
Inventor
G. C. Burkett.
By Milo B. Stevens Co.
Attorneys Patented May 26, 1931

1,807,303

UNITED STATES PATENT OFFICE

GEORGE C. BURKETT, OF INDIAHOMA, OKLAHOMA

TRAILER HITCH

Application filed October 15, 1929. Serial No. 399,802.

My invention relates to trailer hitches, as they are known in the art, and has for its primary object the provision of a novel device of this character which is simple in construction, easy to install, and highly efficient in practical use.

The invention also comprehends a device, as characterized, which has attachment means for application to a rigid portion of the chassis frame of the vehicle to be towed in addition to the customary attachment to the axle of the towed vehicle,—the advantage of the feature recited being that the axle of the towed vehicle is relieved of undue strain.

Another object of the invention resides in the provision of a trailer hitch comprehending adjustable parts, thus rendering the same adaptable for attachment to different makes of automobiles and for efficient use therewith.

The invention also resides in certain novel features of construction, combination and arrangement of the various parts and in modes of operation, all of which will be readily understood and appreciated by those skilled in the art upon reference to the accompanying drawings in connection with the detailed description to follow,—it being understood that the drawings illustrate what is now regarded as a preferred embodiment of the invention. However, the invention is capable of various changes and modifications within the spirit and scope of the subject matter claimed hereinafter.

In the drawings, wherein the same reference characters have been used to designate the same parts in all views, Figure 1 is a bottom plan view illustrating the application of my invention to a common type of automobile,—certain parts of which having been deleted for the sake of clarity;

Figure 1ᴬ is a sectional view taken on the line 1ᴬ—1ᴬ of Figure 1;

Figure 2 is a front elevational view of the device with the tow bar removed;

Figure 3 is a sectional view on the line 3—3 of Figure 1;

Figure 4 is a sectional view on the line 4—4 of Figure 1; and,

Figure 5 is a sectional view on line 5—5 of Figure 1.

Referring specifically to the drawings, the invention comprehends a clamp unit comprising a bearing member 5, the feet 5ᵃ of which are adapted to be disposed against the front portion of the axle 6 of the vehicle to be towed. The rear plate 7 of the clamp unit is held against the rear face of the axle by means of transverse clip members 8 which are secured by bolts 8ᵃ extending therethrough and through the feet 5ᵃ of the bearing member 5.

A rod 9 carried between the bearing ears 7ᵃ of plate 7 and secured by the bolt 10 is adapted for attachment to the pan bolt 9ᵃ of the crankcase which secures the radius rods. Thus, it will be seen that axle 6 is relieved of pulling strain,—the latter being distributed between the axle and the crank case so that there is no danger of the axle being bent or pulled out, so as to speak.

The bearing member 5 is provided with an intermediate sleeve 11 journalled at its ends in bearing portions 11ᵃ and through which extends the transverse bolt 12 adapted to receive the apertured ends of clevis-like members 13 of the draw member 14,—the members 13 being bolted together and through draw member 14, as indicated at 15. Angle blocks 16 secured against the sides of the members 13 by bolts 17, serve to complete the structure of the draft block or member 14.

Each horizontal ear portion 16ᵃ of the angle pieces 16 is apertured to receive the pivot pin 20ᵃ which extends through the bifurcated end portion of a sleeve member 20, the outer end of which is tapped to receive the threaded reach rod 22 which has thereon the lock nut 21. The sleeve and reach rod constructions 20, 22 being duplicates of one another a description of one will suffice for both.

The end of each reach rod 22 is widened and cored out to define a part of the socket element of a ball and socket joint,—such socket portion or element being completed by the block member 23, which is correspondently recessed. The socket portion of the block member 23 and the end 22$^a$ of the reach rod are both flanked on opposite sides by ears which receive bolts 24 whereby the parts are held assembled. Suitable nuts are on the bolts 24, as indicated, and it will be noted that one face of the end assembly 22$^a$, 23 of the reach rod has an opening communicating into the ball socket whereby the ball element 25 formed at the end of a shank 26 will be universally seated in the ball socket,—the shank projecting outwardly therefrom and receiving the split sleeve portion 27 of a member having outward clamp ears 28 adapted to be drawn together by the bolt 29 tapped into the end of a coupling member 32,—which bolt 29 is adapted to be projected through the openings in the ear portions 28.

The coupling member 32 has a hexagonal formation 32$^a$ at its inner end and at this point the same is tapped to receive the projecting end of the threaded spindle arm 34, which are secured as usual to the spindles 35 of the wheels 36.

It is believed to be obvious that when the draft bar 14, which is secured in the space between the clevis members 13 and angle pieces 16 is swung laterally in one direction or the other, the wheels of the vehicle being towed will be swung in proper direction so that the towed vehicle will follow the towing vehicle. It is to be noted that the universal joints,—that is to say the ball and socket joints, at the end of each reach rod 22 enable the draft bar 37 to be elevated or lowered considerably without in anyway interfering with the operative steering connection between sleeve 32 and the spindle arms.

Having thus described my invention, what I claim as new and desire to secure by Letters Patent is:

A device of the class described comprising an axle, spindles mounted on the axle, pairs of front and rear clamping members straddling the axle, means for securing said members to the axle, a U-shaped member, a link pivotally connecting said member to the crank case of the vehicle to be towed, said rear clamping members securing the U-shaped member to the axle, and the front clamping members having forwardly extending recessed portions, a vertically swingable block provided with integral extensions journaled in the recessed portions of said front clamping members, a vertically arranged bolt passing through said block and a draft member pivoted thereon for horizontal swinging movement, angle block secured to the draft bar, bifurcated members pivotally connected to said angle blocks and having rods adjustably secured thereto and to the axle spindles of the vehicle.

In testimony whereof I affix my signature.

GEORGE C. BURKETT.